United States Patent [19]

Kumar et al.

[11] Patent Number: 5,658,497
[45] Date of Patent: Aug. 19, 1997

[54] PROCESS FOR THE CATALYTIC PARTIAL OXIDATION OF HYDROCARBONS USING A CERTAIN CATALYST SUPPORT

[75] Inventors: Krishnankutty Nair Padma Kumar; Peter William Lednor; Jean-Paul Lange; Ronald Jan Schoonebeek; Katherine Searcy-Roberts; Gerardus Petrus Van Der Zwet, all of Amsterdam, Netherlands

[73] Assignee: Shell Oil Company, Houston, Tex.

[21] Appl. No.: 567,605

[22] Filed: Dec. 5, 1995

[51] Int. Cl.[6] .............................. B66D 1/34; B01J 29/04; B01J 21/00
[52] U.S. Cl. .............................. 252/373; 502/60; 502/74
[58] Field of Search .......................... 502/60, 74; 252/373

[56] References Cited

U.S. PATENT DOCUMENTS

| 4,076,888 | 2/1978 | Perugini et al. ................. 428/313 |
| 4,520,124 | 5/1985 | Abe et al. ......................... 502/159 |
| 4,810,685 | 3/1989 | Twigg . |
| 5,427,721 | 6/1995 | Brezny . |

FOREIGN PATENT DOCUMENTS

| 198186 | 10/1986 | European Pat. Off. . |
| 0 567 096 A2 | 6/1993 | European Pat. Off. . |
| 3433197 | 3/1995 | Germany . |

Primary Examiner—Paul J. Killos
Assistant Examiner—Karl Puttlitz, Jr.
Attorney, Agent, or Firm—Kim Muller

[57] ABSTRACT

A process is disclosed for the partial oxidation of a hydrocarbon feedstock to produce a hydrogen and carbon monoxide synthesis gas employing a temperature of 800° C. or more, one or more inorganic oxide or oxides and space velocities of 500,000 Nl/kg/hr or higher. The catalyst is present on a foamed support which has been present with an impregnating medium comprising one or more inorganic oxide or oxides having a viscosity of greater than 1 cps at 20° C.

18 Claims, No Drawings

PROCESS FOR THE CATALYTIC PARTIAL OXIDATION OF HYDROCARBONS USING A CERTAIN CATALYST SUPPORT

FIELD OF THE INVENTION

The present invention relates to a process for the preparation of ceramic foams supporting inorganic oxide(s) and catalytic applications thereof, particularly the preparation of ceramic foams supporting high loadings of inorganic oxides, and applications thereof as catalyst support in catalytic conversion reactions, and more particularly in the preparation of carbon monoxide and hydrogen by the partial oxidation of a hydrocarbon feed.

BACKGROUND OF THE INVENTION

Ceramic foams are known for various applications, in particular more recently as supports for catalytically active materials fulfilling several requirements simultaneously, as described in "Preparation and properties of ceramic foam catalyst supports" by M V Twigg and J T Richardson published in the "Scientific Bases for the preparation of heterogeneous catalysts" 6th International Symposium Sep. 5–8 1994 Louvalne La Neuve, Belgium. Open pore ceramic foams are materials with high temperature resistance, low bulk density and tortuous flow patterns by virtue of connecting adjacent pores or "cells" providing non-linear channels. Ceramic foams enable the passage of gases at high space velocities and acceptable pressure drop but they do not offer the surface area available with conventional catalyst forms such as extrudates. Commercially available foams may have a BET surface area (as defined in "Adsorption surface area and porosity" S J Gregg & K S W Sing, Academic Press London 1982) of typically less than 1 m2/g, in particular of about 0.2 or 0.3 m2/g after high temperature calcination for a prolonged period, which is too low to be useful in the majority of catalytic applications. A high surface area is generally accepted to be advantageous in providing a high surface area of catalytically active material per unit bed volume, in particular for operation of high pressure drop conversion processes in which a high catalyst bed volume can lead to the need for excessive space velocities. Twigg and Richardson report an alumina washcoating technique for the stabilization of a 30 pore per inch alpha-alumina/mullite ceramic foam at high temperature, whereby a four-fold increase in surface area of the ceramic foam was achieved after calcining at 1000° C. for 4 hours.

U.S. Pat. Nos. 4,810,685 and 4,863,712, corresponding to EP 0 260 826, disclose ceramic foam supports suited for use in steam reforming of methane, comprising a network of irregular passages extending therethrough, comprising supported catalytically active material and an inorganic oxide stabilizer to prevent sintering of the active material. The stabilizer and the active material are introduced by impregnation of the foam by means of immersion of the foam in an aqueous solution of a salt of the stabilizer and the active component, draining to remove excess solution and firing at 450° C. This process is repeated to build up sufficient impregnant layer on the foam. However the foams described are to be used at relatively low temperatures, of the order of 760° C., and may not give the desired stabilization at higher temperatures. This process is suited for the stabilization of the active component in the existing (low) surface area foam, but does not address enhancing the surface area of the existing low surface area foam. The application of this process for enhanced surface area of the low surface area foam is laborious and time consuming.

FR 2 590 887 (no U.S. equivalent found) discloses zirconium oxides having stable surface area at elevated temperatures, the oxide comprising as additive an oxide of silica, the rare earths, yttria, ceria and/or aluminum. The additive may be introduced by various means including co-precipitation, mixing of salt with sol hydrate and impregnation of the zirconium oxide with a salt precursor of the additive. Impregnation is preferably performed "dry" whereby the total volume of the impregnating solution is approximately equal to the total pore volume of the (oxide) support. It is taught by means of example to impregnate extruded support granules with the aqueous impregnating solution, to dry at 160° C. for 16 hours and calcine at 400° C. The additive is nevertheless present in low amounts of 1 to 10wt % based on the weight of the total composition. The support may be in the form of granules or pellets. The BET surface area is increased from 20 m2/g without additive to 40–50 m2/g with additive at 900° C. This document discloses the impregnation of mesoporous structures, wherein the additive is adsorbed and crystallized onto the support. There is no reference to supports in the form of foam structures, which comprise pores of several orders of magnitude greater than the mesoporous, and for which a different mechanism of supporting of the additive is involved.

The provision of ceramic foams having significant increase in BET surface area remains a problem. There is a need for a ceramic foam structure and preparation thereof which is suited to the extreme conditions encountered in some processes, and moreover which exhibits improved stability when compared with known foam supports.

DESCRIPTION OF THE INVENTION

It has now surprisingly been found that in a particular process for the preparation of ceramic foams supporting inorganic oxide(s) a significant increase in surface area can be attained which is favorable at temperatures at or above 800° C.

There is provided according to the present invention a process for the preparation of a ceramic foam supporting one or more inorganic oxide(s) comprising impregnation of the foam with an impregnating phase comprising the inorganic oxide(s) in an impregnating medium and drying wherein the impregnating phase has a viscosity greater than 1 cps, i.e. greater than water.

It is a particular feature of the invention that the use of an impregnating solution more viscous than water allows significant retention of the impregnating medium in the foam pores. This is a problem not encountered in the impregnation of other materials having pore sizes orders of magnitude less than typically found in ceramic foams. It has been found that the resulting impregnated material has superior characteristics to materials impregnated by known methods of aqueous "wet" impregnation or wash coating.

Suitably the impregnating phase has a viscosity of greater than 1 cps at 20° C., preferably of from 5 to 80 cps, more preferably from 7 to 50 cps. A suitable viscosity may be selected according to the properties of the ceramic foam, in particular the pore size thereof.

Suitably the drying is performed without substantial prior draining of excess impregnating medium from the ceramic foam. Preferably the pores of the foam are substantially filled with impregnating medium prior to drying. Preferably the foam pores are filled by at least 60% with sol, more preferably by at least 85%. Suitably the ceramic foam is immersed slowly or incrementally into the impregnating phase whereby formation of air pockets is prevented, this enabling filling of the pores. The impregnation may be carried out at or below atmospheric pressure. With use of foams of low pore diameters it may be particularly advantageous to impregnate at reduced pressure of between 0.5 and 1 atmospheres. The pore volume may be calculated on the basis of the density, weight and dimensions of the foam, whereby the amount of impregnating medium required may be determined.

The impregnating medium may be in the form of any suitable liquid having viscosity greater than that of water. Suitably the impregnating medium is in the form of an aqueous or organic solution, slurry, sol, gel, suspension or dispersion of inorganic oxide(s) particles, preferably of a sol of colloidal inorganic oxide(s) particles. The preparation of such impregnating media is well known in the art. A sol may be prepared in particular by means of peptizing a slurry of the inorganic oxide(s) or precursor thereof. Alternatively where it is desired to impregnate a ceramic foam with more than one inorganic oxide, a commercially available sol, for example an alumina sol may be adapted by the addition of the further inorganic oxide(s).

The impregnating phase may be stabilized to attain an inorganic oxide(s) particle size of less than 300 nm, preferably less than 150 nm, more preferably in the range of 5 to 50 nm. Stabilization may be performed by any known means, for example by electrostatic stabilization or "depletion" stabilization by addition of a polymer or other impregnating medium modifier. It may be additionally advantageous to treat the impregnating phase to minimize the content of inorganic particles greater than 300 nm, preferably greater than 150 nm, more preferably greater than 50 nm, for example by means of ultrasound. This is of particular advantage with use of ceramic foams of small pore dimensions.

Suitably the impregnating phase employed has a solid content of greater than 5 wt % whereby a sufficient amount of inorganic oxide(s) precursor is introduced into the pores. Preferably the solids content is between 7 and 40 wt %, the maximum solids loading depending on the loading at which inorganic oxide(s) precursors particles dispersion deteriorates, or flocculation occurs. At significantly lower solids loadings, the formation of a coherent film will be inhibited.

Preferably the foam is pretreated prior to impregnation, in order to improve the dispersion and cohesion of the eventual impregnated oxides. A pretreatment with water and drying prior to impregnation with the inorganic oxide(s) has been found to give improved impregnation of the foams.

The dried impregnated inorganic oxide may be in the form of a coherent or incoherent film coating of the ceramic foam. A calcined ceramic foam having a coherent film coating will generally exhibit attractive surface area enhancement having high stability and is particularly preferred where it is desired to modify the bulk properties of the ceramic foam. This has found to be attained with the use of impregnating medium in the form of a coherent dispersion, preferably a dispersion of colloidal particles in liquid. A coherent film coating may for example be derived from a partially dried impregnated oxide in the form of a hydrogel, in particular from impregnation of an impregnating phase characterized by a gelling time substantially equal to its drying time or, where gelling commences during impregnation, to the combined impregnation and drying time.

Suitably the ceramic foams of the invention comprise a layer of the inorganic oxide of thickness greater than 0.5 micron, preferably of greater than 1 micron. The ceramic foams of the invention typically are obtained with a layer of the inorganic oxide of up to 2.5 micron. The thickness of the layer may be determined by choice of inorganic oxide(s) solid content of the impregnating phase. In general, the greater the layer thickness the greater the increase in surface area of the foam, and the greater the tortuosity and pressure drop presented by the foam.

Suitable ceramic foams to be employed in the present invention are for example those having from 30 pores per inch. Commercially available foams are generally in the range of up to 150 pores per inch. The choice of foam will generally depend on the intended use, whereby increase in pores per inch rating generally corresponds to an increase in tortuosity and pressure drop of a fluid passed through the foam. In specific applications there is a need for a high tortuosity foam. The term "tortuosity" is a common term which, when referring to a fixed catalyst bed, can be defined as the ratio of the length of the path taken by a gas flowing through the bed to the length of the shortest straight line path through the bed. Thus a non-tortuous bed, such as a honeycomb monolith structure, has a tortuosity of 1.0. Suitably ceramic foams of the present invention have a tortuosity of at least 1.1, for example of 1.1 to 10.0, more preferably of 1.1 to 5.0, most preferably of 1.3 to 4.0.

The inorganic oxide(s) to be impregnated according to the process of the invention may suitably comprise any high temperature stable high surface area inorganic oxide. Such oxides may include but are not limited to oxides comprising one or more cations selected from groups IA, IIA, IIIA and IVA of the Periodic Table of the Elements and the transition metals, preferably from groups IA, IIA, ILIA, IIIB, IVA, IVB and the lanthanides, more preferably from aluminum, lanthanum, zirconium and barium. Preferred inorganic oxides to be impregnated in ceramic foams employed as catalytic supports in a process for the preparation of carbon monoxide and hydrogen by the partial oxidation of a hydrocarbon feedstock include those above defined, more preferably oxides comprising aluminum as the only cation or comprising more than one of the above defined cations. The foam may be impregnated with more than one inorganic oxide simultaneously or sequentially.

Inorganic oxides comprising more than one of the above cations present several advantages, for example an oxide may be employed comprising one cation as above defined, such as lanthanum giving desired performance in the intended use of the foam, together with a further cation as above defined, such as aluminum of which the precursor is readily dispersed in the impregnating phase. By this means the solids loading may be increased without prejudicing the performance of the impregnated material. In a preferred embodiment the present invention relates to the impregnation of ceramic foams as hereinbefore defined with an impregnating phase having enhanced solids content of inorganic oxide precursor comprising a first cation as hereinbefore defined, by inclusion or increased content of a second cation as hereinbefore defined of which the inorganic oxide precursor is characterized by a higher dispersion capacity in the impregnating phase, preferably a second cation is aluminum.

Ceramic foams prepared according to the present invention may suitably additionally comprise a catalytically active component. A catalytically active component may be impregnated simultaneously or subsequently onto the ceramic foam or the inorganic oxide supported ceramic foam. Preferred catalytically active components to be impregnated in ceramic foams employed as catalytic supports in a process for the preparation of carbon monoxide and hydrogen by the partial oxidation of a hydrocarbon feedstock include a metal or precursor of a metal selected from Group VIII of the Periodic Table of the Elements, preferably selected from ruthenium, rhodium, palladium, osmium, iridium and platinum, more preferably rhodium, platinum and iridium.

In a further aspect the present invention provides the use of ceramic foams obtained as above defined as a catalytic support in a catalytic conversion process. Particular advantages are obtained with the use of ceramic foams obtained as above defined as a catalytic support in a high pressure drop conversion process employing temperatures greater than or equal to 800° C., preferably employing space velocities greater than or equal to 500,000 Nl/kg/hr, more preferably in a process for preparation of carbon monoxide and hydrogen by the partial oxidation of a hydrocarbon feed.

The invention is now illustrated by means of non-limiting example.

Example 1—Preparation of a composition of the invention

Alpha alumina foams with 30 pores per inch were modified by sol impregnation with boehmite sol, having a solid content of 20wt % on Al2O3 basis and a viscosity of 10 cps. Before impregnation with the sol the foams were first impregnated with water and dried at 55° to 60° C. Impregnation with the sol was then effected by immersing it, first partly and after 2 hours fully in the sol for 6 hours under 0.8 atmosphere vacuum. The samples were then dried at 55° to 60° C. for 12 to 14 hours. After drying the samples were calcined at temperatures ranging from 800° to 1100° C. for 8 hours. The foams were weighed before modification and after drying and calcination. Samples of the unimpregnated alpha alumina foams with 30 pores per inch were also weighed, calcined at temperatures ranging from 800° to 1100° C. for 8 hours and reweighed for comparison purpose.

Example 2—Preparation of a composition of the invention

Partially stabilized zirconia (Zr—Ca) foams with 50 pores per inch were modified by sol impregnation with lanthana alumina sols having a solids content of 13wt % on oxide basis and a viscosity of 10 cps according to the process of Example 1. The sols were obtained by adding lanthanum nitrate solution to a commercial alumina sol. The samples were then dried at 55° to 60° C. for 12 to 14 hours. After drying the samples were calcined at temperatures ranging from 1100° to 1300° C. for 8 hours. After the first impregnation some samples were calcined at 600° C. and then subjected to a second impregnation treatment. A sample of the impregnation sol was weighed, dried and calcined to a gel under the same conditions as the foams and reweighed. The foams were weighed before modification and after drying and calcination.

The results of Examples 1 and 2 are given in Tables 1 and 2 below.

TABLE 1

Weight gain, and impregnated layer thickness for compositions of examples 1 after calcination at different temperatures for 8 hours.

| Sample of Expt no./calcination T (°C.) | Initial weight of foam (g) | % weight gain relative to initial weight | Thickness of impregnated layer (micron) |
|---|---|---|---|
| 1/800 | 8.01 | 44 | 2.5 |
| 1/900 | 8.09 | 44 | 2.3 |
| 1/1000 | 8.25 | 41 | 2.0 |
| 1/1100 | 8.65 | 40 | 1.2 |

TABLE 2

Measured BET surface area (SA) for untreated foams and compositions of Examples 1 and 2 after calcination at different temperatures for 8 hours.

| Sample of Expt No./pores per inch | Calcination Temperature and time (°C., hours) | SA of untreated foam (m²/g) | SA dried/-calcined impregnating sol (m²/g) | SA of calcined impregnated foam (m²/g) | SA of calcined washcoat foam (m²/g) |
|---|---|---|---|---|---|
| 1/30 | 900/8 | <0.1 calcined |  | 41 |  |
| 1/30 | 1000/8 | <0.1 calcined | 15 | 4.9 |  |
| Comp.¹/30 | 1000/4 | 1.0 fresh |  |  | 4.0 |
| 2/50 | 1000/8 | 0.23 calcined | 78 | 4.0 |  |
| 2/50 | 1100/8 | 0.23 calcined | 55 | 3.6 |  |
| 2/50 | 600/8 1100/8 | 0.23 calcined |  | 7.0 (2x impregnated) |  |

[1] Alumina washcoat stabilization of a 30 pore per inch alpha-alumina/mullite ceramic foam calcined at 1000° C. for only 4 hours, as reported in "Preparation and properties of ceramic foam catalyst supports" by M V Twigg and J T Richardson published in the "Scientific Bases for the preparation of heterogeneous catalysts" 6th International Symposium September 5–8 1994 Louvaine-la-Neuve, Belgium.

After calcining at 900° C. and 1000° C. for 8 hours the compositions of Example 1 according to the invention give surface areas of the order of 400 and 50 times the starting surface area of the unmodified foam. This is favorably comparable with the comparison¹ calcined under less severe conditions.

The compositions of Example 2 calcined at 1000 ° C. and 1100 ° C. give favorable stabilization of surface areas of a partially stabilized zirconia foam, when compared with measured surface areas of the corresponding dried and calcined impregnating sol. Exceptionally high surface areas may be obtained with repeated impregnation as illustrated in Example 2.

What we claimed as our invention is:

1. In a process for the catalytic partial oxidation of a hydrocarbon feedstock to produce a synthesis gas comprising hydrogen and carbon monoxide which employs temperatures greater than or equal to 800° C., a catalyst comprising a foamed support for one or more inorganic oxide or oxides catalysts and space velocities greater than or equal to 500.000 Nl/gk 1 hr, the improvement which comprises impregnation of said foamed catalyst support with an impregnating medium comprising one or more inorganic oxide or oxides and having a viscosity of greater than 1 cps at 20° C. which is treated by means of ultrasound to minimize the content of inorganic precursor particles having a size greater than 300 nm and; whereafter the support is dried before use in the catalytic partial oxidation process.

2. The process according to claim 1 wherein the viscosity of the impregnating medium ranges from 5 to 80 cps at 20° C.

3. The process according to claim I wherein the viscosity of the impregnating medium ranges from 7 to 50 cps at 20° C.

4. The process according to claim i wherein pores of the ceramic foam are substantially filled with impregnating medium prior to drying and said drying is performed without substantial draining of excess impregnating medium from the ceramic foam.

5. The process according to claim 1 wherein the impregnating medium is in the form of an aqueous or organic solution, slurry, sol, gel, suspension or dispersion.

6. The process according to claim 5 wherein the impregnating medium is in the form of a sol of colloidal inorganic oxide precursor particles.

7. The process according to claim 1 wherein the impregnating medium is stabilized to attain inorganic oxide or oxides having particle size of less than 300 nm.

8. The process according to claim 1 wherein the impregnating medium is stabilized to attain inorganic oxide or oxides having particle size of less than 150 nm.

9. The process according to claim 1 wherein the impregnating medium is stabilized to attain inorganic oxide or oxides having particle size is in the range of 5 to 50 nm.

10. The process according to claim 9 wherein the stabilization is effected by the addition of a polymer.

11. The process according to claim 1 wherein the impregnating medium is treated by ultra sound to minimize the content of inorganic precursor particles having a size of greater than 150 nm.

12. The process according to claim 1 wherein the impregnating medium is treated to minimize the content of inorganic precursor particles having a size of greater than 50 nm by means of ultrasound.

13. The process according to claim 1 wherein the impregnating medium has a solids content of greater than 5 wt %.

14. The process according to claim 1 wherein the foamed catalyst support has a tortuosity in the range of from 1.1 to 10.0.

15. The process according to claim 1 wherein the foamed catalyst support has a tortuosity in the range of from 1.1 to 5.0.

16. The process according to claim 1 wherein the foamed catalyst support has a tortuosity in the range of from 1.1 to 4.0.

17. The process according to claim 1 wherein the inorganic oxide or oxides comprise one or more cations selected from Groups IA, IIA, IIIA and IVA of the Periodic Table of Elements and transition metals from Groups IA, IIA, IIIA, IIIB, IVA and IVB of the Periodic Table and lanthanides.

18. The process according to claim 17 wherein the inorganic oxides comprise aluminum lanthanum, zirconium and barium.

* * * * *